United States Patent [19]

Mizuno

[11] Patent Number: 4,670,527

[45] Date of Patent: Jun. 2, 1987

[54] SHAPED ARTICLE OF VINYLIDENE FLUORIDE RESIN AND PROCESS FOR PREPARING THEREOF

[75] Inventor: Toshiya Mizuno, Iwaki, Japan

[73] Assignee: Kureha Kagaku Kogyo Kabushiki Kaisha, Tokyo, Japan

[21] Appl. No.: 745,510

[22] Filed: Jun. 17, 1985

Related U.S. Application Data

[63] Continuation-in-part of Ser. No. 527,485, Aug. 29, 1983, abandoned, which is a continuation-in-part of Ser. No. 416,586, Sep. 10, 1982, abandoned, and a continuation-in-part of Ser. No. 350,410, Feb. 19, 1982, abandoned.

[30] Foreign Application Priority Data

| Mar. 2, 1981 | [JP] | Japan | 56-20740 |
| Mar. 11, 1981 | [JP] | Japan | 56-33831 |
| Sep. 1, 1982 | [JP] | Japan | 57-150666 |

[51] Int. Cl.$^4$ .................. D01D 5/098; D01F 6/12
[52] U.S. Cl. .................. 526/255; 264/176.1; 264/210.7; 264/210.8; 264/216
[58] Field of Search ......... 264/210.1, 210.2, 210.3, 264/210.7, 210.8, 103, 176 F, 176 R, 171, 173; 526/255

[56] References Cited

U.S. PATENT DOCUMENTS

| 3,197,538 | 7/1965 | Capron et al. | 264/288.4 |
| 3,707,592 | 12/1972 | Ishii et al. | 526/255 |
| 3,878,274 | 4/1975 | Murayama et al. | 264/22 |
| 3,925,339 | 12/1975 | Ishii et al. | 526/255 |
| 4,076,929 | 2/1978 | Dohany | 526/255 |
| 4,222,982 | 9/1980 | Beatty et al. | 264/176 R |
| 4,254,072 | 3/1981 | Capaccio et al. | 264/210.3 |
| 4,264,555 | 4/1981 | Lang et al. | 264/176 F |
| 4,280,802 | 7/1981 | Lang et al. | 264/176 F |
| 4,287,149 | 9/1981 | Capaccio et al. | 264/290.5 |
| 4,302,408 | 11/1981 | Ichihara et al. | 264/22 |
| 4,328,055 | 5/1982 | Nakamura et al. | 264/103 |
| 4,339,499 | 7/1982 | Tappe et al. | 428/373 |
| 4,344,908 | 8/1982 | Smith et al. | 264/205 |

FOREIGN PATENT DOCUMENTS

| 48-13712 | 4/1973 | Japan | 264/22 |
| 48-43763 | 6/1973 | Japan | 526/255 |
| 56-117627 | 9/1981 | Japan | 264/173 |

Primary Examiner—Jeffery Thurlow
Attorney, Agent, or Firm—Oblon, Fisher, Spivak, McClelland & Maier

[57] ABSTRACT

Disclosed herein are a shaped article of vinylidene fluoride resin having an inherent viscosity of 0.85 to 1.4 dl/g, Huggins' constant of not more than 0.45, an average length of crystals in the direction of oriented molecular chains of the resin of longer than 200 Å, a birefringence of not less than $30 \times 10^{-3}$ and a Young's modulus of not less than 450 kg/mm$^2$ and a process preparing the shaped article comprising the steps of melt-extruding the resin, drafting the thus melt-extruded resin, and cooling the thus drafted resin.

33 Claims, 4 Drawing Figures

SHAPED ARTICLE OF VINYLIDENE FLUORIDE RESIN AND PROCESS FOR PREPARING THEREOF

CROSS-REFERENCES TO RELATED APPLICATION

This application is a continuation-in-part of U.S. patent application, Ser. No. 527,485 filed Aug. 29, 1983 now abandoned which is a continuation-in-part of the U.S. patent application, Ser. No. 350,410 filed Feb. 19, 1982, abandoned and pending application Ser. No. 416,586 filed Sept. 10, 1982, now abandoned.

SUMMARY OF THE INVENTION

In a first aspect of the present invention, there is provided a shaped article of vinylidene fluoride resin having an inherent viscosity of 0.8 dl/g to 1.4 dl/g, Huggins' constant of not more than 0.45, an average length of crystals in the direction of the molecular chains of said resin of longer than 200 Å, Young's modulus of not less than 450 kg/mm$^2$ and a birefringence of not less than $30 \times 10^{-3}$.

In a second aspect of the present invention, there is provided a process for preparing a filament of vinylidene fluoride resin, comprising the steps of melt-extruding a vinylidene fluoride resin having an inherent viscosity of 0.85 dl/g to 1.4 dl/g and Huggins' constant of not more than 0.45 at a shear rate of not more than 200 sec$^{-1}$ and at a temperature of higher than the melting point of the vinylidene fluoride resin, subjecting the thus melt-extruded resin to drafting at a draft ratio (R) represented by the following formula:

$$\frac{R}{540} + \frac{\eta_{app}}{5.4 \times 10^4} \geq 1$$

wherein $\eta_{app}$ is an apparent melt-viscosity (unit: poise, hereinafter) of the resin melt-extruded through a nozzle of 1 mm in diameter and 3 mm in length of a Melt-indexer at the same temperature as in the melt-extruding step, thereby orienting the molecular chains of the resin to the extent that the birefringence of the thus treated resin becomes to not less than $30 \times 10^{-3}$ (the birefringence is the value at room temperature after being subjected to cooling without substantially causing orientation relaxation), and cooling the thus drafted resin without substantially causing orientation relaxation to a temperature of lower than the temperature at which the velocity of crystallization of said vinylidene fluoride resin is maximum.

In a third aspect of the present invention, there is provided a process for preparing a film of vinylidene fluoride resin, comprising the steps of melt-extruding a vinylidene fluoride resin having an inherent viscosity of 0.85 dl/g to 1.40 dl/g and Huggins' constant of not more than 0.45 from a T-die at a shear rate of not more than 200 sec$^{-1}$ and at a temperature of higher than the melting point of the vinylidene fluoride resin, subjecting the thus melt-extruded vinylidene fluoride resin to drafting at a draft ratio of higher than 50, while retaining the distance between the outlet of said T-die and the point at which film of the vinylidene fluoride resin begins to contact with a roll to which the melt-extruded vinylidene fluoride resin contacts at the first time less than 10 cm, the drafting being carried out substantially before the melt-extruded resin is contacted with the roll, and cooling said vinylidene fluoride resin thus subjected to drafting to a temperature of lower than the temperature at which the velocity of crystallization of said vinylidene fluoride resin is maximum.

BACKGROUND OF THE INVENTION:

The present invention relates to a shaped article of vinylidene fluoride resin having an inherent viscosity of 0.85 to 1.4 dl/g, Huggins' constant of not more than 0.45, an average length of crystals in the direction of the molecular chains of the resin of longer than 200 Å, Young's modulus of not less than 450 kg/mm$^2$ and a birefringence of not less than $30 \times 10^{-3}$, and relates to a process for preparing a filament of vinylidene fluoride resin, comprising the steps of melt-extruding a vinylidene fluoride resin having an inherent viscosity of 0.85 dl/g to 1.4 dl/g and Huggins' constant of not more than 0.45 at a shear rate of not more than 200 sec$^{-1}$ and at a temperature of higher than the melting point of the vinylidene fluoride resin, subjecting the thus melt-extruded resin to drafting at a draft ratio (R) represented by the following formula:

$$\frac{R}{540} + \frac{\eta_{app}}{5.4 \times 10^4} \geq 1$$

wherein $\eta_{app}$ is an apparent melt-viscosity of the resin melt-extruded through a nozzle of 1 mm in diameter and 3 mm in length of a Melt-indexer at the same temperature as in the melt-extruding step, thereby orienting the molecular chains of the resin to the extent that the birefringence of the thus treated resin becomes to not less than $30 \times 10^{-3}$ (the birefringence is a value at room temperature after being subjected to cooling substantially without causing orientation relaxation), and cooling the thus drafted resin without substantially causing orientation relaxation to a temperature of lower than the temperature at which the velocity of crystallization of said vinylidene fluoride resin is maximum and to a process for preparing a film of vinylidene fluoride resin, comprising the steps of melt-extruding a vinylidene fluoride resin having an inherent viscosity of 0.85 dl/g to 1.40 dl/g and Huggins' constant of not more than 0.45 from a T-die at a shear rate of not more than 200 sec$^{-1}$ and at a temperature of higher than the melting point of the vinylidene fluoride resin, subjecting the thus melt-extruded vinylidene fluoride resin to drafting at a draft ratio of higher than 50, while retaining the distance between the outlet of said T-die and the point at which film of the vinylidene fluoride resin begins to contact with a roll to which the melt-extruded vinylidene fluoride resin contacts at the first time less than 10 cm, the drafting being carried out substantially before the melt-extruded resin is contacted with the roll, and cooling said vinylidene fluoride resin thus subjected to drafting to a temperature of lower than the temperature at which the velocity of crystallization of said vinylidene fluoride resin is maximum.

Namely, the object of the present invention is to provide a shaped article of a vinylidene fluoride resin, which is excellent in surface texture and has Young's modulus of not less than 450 kg/mm$^2$ and a process for preparing the shaped article.

The hitherto-known value of Young's modulus of the filament of vinylidene fluoride resin has been at most 250 to 300 kg/mm$^2$, and that of the film of vinylidene fluoride resin has been at most 100 to 140 kg/mm$^2$ in a non-stretched state and at most 180 to 260 kg/mm$^2$ in a stretched state thereof.

Young's modulus mentioned in the present invention is the initial modulus shown by the specimen of the shaped article of 100 mm in length and in the case where the specimen is a film, 20 mm in width, when the specimen is subjected to tensile stress into the drafting direction at a tensile velocity of 10 mm/min at 23° C. on a tensile tester.

The conventional filament or the film of Young's modulus of such an extent as shown above is insufficient for various uses. For instance, when such a filament is used in angling, a good catch is not available because of poor communication of a bite via the filament, and as the ordinary fibers, the conventional filament of vinylidene fluoride resin is poor in stiffness. Further, as the strings of electronic musical instruments and the guts of tennis rackets, such a filament of vinylidene fluoride resin is poor in resilience and accordingly, it cannot make them exhibit their own performances.

In addition, in the case where the vinylidene fluoride resin is applied to window panes of a sun-bathing room while utilizing its property of transmitting ultraviolet rays of wave length in a range of 2800 to 3300 Å (so-called Dorno rays) which are not transmitted by the ordinary glass pane, the healthy ultraviolet rays can be available, however, since the conventional film of vinylidene fluoride resin is poor in Young's modulus, it is apt to be deformed or slackened even by a slight external stress and accordingly, a very careful handling has been necessary to apply the film of vinylidene fluoride resin to such an use.

Further, since the vinylidene fluoride resin is excellent in weatherproofness, a large demand will be expected broadly in various outdoor uses, for instance, as building material, industrial material, transporting material, etc. in the event of improving its Young's modulus. In addition, since the strength of vinylidene fluoride resin is scarcely reduced in water, the use thereof in the marine development is greatly expected in the even of improving its Young's modulus.

Besides, the elongation at break of the conventional shaped articles of vinylidene fluoride resin is a relatively large, the smallest one having been 20% and accordingly, it is another object of the present invention to provide a shaped article of vinylidene fluoride resin, which has a smaller elongation even under a large stress and further, a sufficiently large tensile strength.

The present inventor, in consideration that the polyester fiber or the polypropylene fiber of high Young's modulus has hitherto been obtained by high-speed melt-spinning, that is, rapidly cooling the molten polyester or polypropylene while giving thereto a large shear strain, thereby orienting the polymer molecular chains and crystallizing thereof had an idea that a shaped article of vinylidene fluoride resin of a high Young's modulus may be obtained by the same process as above. However, it has been actually found by the present inventor that different from the case of polyester fiber or polypropylene fiber, in the case of vinylidene fluoride resin, a shaped article of vinylidene fluoride resin of such a high Young's modulus can be obtained only under the severely restricted conditions of melt-viscosity of vinylidene fluoride resin and the extent of branching of the polymer molecule thereof.

In addition, different from the filament of polyester or polypropylene, the film thereof of a high Young's modulus has not been obtained by the above-mentioned process as well as the film of vinylidene fluoride resin.

It has been found by the present inventor's studies that different from the case of filament, the film of vinylidene fluoride resin of the demanded high Young's modulus is obtainable only in the case when the melt-extruded resin is subjected to drafting at a closely restricted position very near to the outlet of the extruding die.

The present invention has been attained based on the above-mentioned findings of the present inventor.

BRIEF EXPLANATION OF DRAWING:

Of the attached drawing.

DETAILED DESCRIPTION OF THE INVENTION:

The present invention relates to a shaped article of vinylidene fluoride resin having an average length of crystals in the direction of oriented molecular chains thereof of longer than 200 Å, a birefringence of not less than $30 \times 10^{-3}$ and a Young's modulus of not less than 450 kg/mm$^2$ and a process for preparing the shaped article of vinylidene fluoride resin.

The vinylidene fluoride resin used in the present invention has an inherent viscosity of 0.85 dl/g to 1.40 dl/g, preferably 0.90 dl/g to 1.30 dl/g and more preferably 1.0 dl/g to 1.20 dl/g. It is difficult to shape the resin showing an inherent viscosity of over 1.40 dl/g into any shaped article and in the case where such a resin is subjected to shaping at a higher temperature, it is apt to be thermally decomposed, and on the other hand, the shaping of a resin showing an inherent viscosity of below 0.85 dl/g is apt to cause unevenness in the diameter or the cross-sectional area of the shaped article. In short, the resin having an inherent viscosity deviating from the above-mentioned range cannot be highly drafted after melt-extruding, thus resulting in the shaped article poor in mechanical strength.

The inherent viscosity of vinylidene fluoride resin mentioned herein means the inherent viscosity determined on a solution of the specimen in dimethylacetamide at a concentration of 0.4 g/dl and at a temperature of 30° C.

In addition, Huggins' constant of the vinylidene fluoride resin used according to the present invention must be not more than 0.45, because the resin showing Huggins' constant of over 0.45 cannot be subjected to drafting at a sufficiently high draft ratio.

The Huggins' constant of vinylidene fluoride resin herein mentioned means the Huggins' constant determined on a solution of the specimen in dimethylacetamide at a temperature of 30° C. The preferable value of Huggins' constant of the vinylidene fluoride resin for use in the present invention is not more than 0.4, more preferably not more than 0.35.

The vinylidene fluoride resin used according to the present invention is the resin including the homopolymer of vinylidene fluoride or copolymer of vinylidene fluoride containing not less than 90 mol%, preferably not less than 95 mol% and more preferably not less than 97 mol% of vinylidene fluoride units as the main component or the resin composition containing not less than 70% by weight, preferably not less than 90% by weight of the homopolymer of vinylidene fluoride or the above-mentioned copolymer of vinylidene fluoride.

In addition, it is preferable that the distribution of molecular weight of the vinylidene fluoride resin used according to the present invention, which is represented by the ratio of weight-average molecular weight($\overline{M}_w$) to number-average molecular weight($\overline{M}_n$), i.e., ($\overline{M}_w/\overline{M}_n$) is as narrow as possible. Namely, the resin showing the value of ($\overline{M}_w/\overline{M}_n$) of not more than 10, particularly not more than 5 is preferably used for the purpose of the present invention.

The weight-average molecular weight and the number-average molecular weight of the vinylidene fluoride resin are measured by gel-permeation chromatography while using polystyrene as the standard substance on a solution of the specimen in dimethylacetamide (0.1 g of the specimen dissolved in 25 ml of dimethylacetamide at 70° C. within 2 hours) at a temperature of 30° C.

Furthermore, in order to attain the purpose of the present invention more completely, it is preferable to prepare the shaped article of vinylidene fluoride resin showing the average length of crystals in the direction of the oriented molecular chains thereof of longer than 250 Å and the birefringence of not less than $33 \times 10^{-3}$.

The average length of crystals in the direction of oriented molecular chains of the resin is measured by the following method.

Strength of diffraction of the incident X-ray parallel to the axis of drafting(or stretching) concerning the diffracting planes perpendicular to the direction of the oriented molecular chains of the resin, usually the diffracting plane which gives the strongest diffraction, for instance, (002) plane of α-type crystals of vinylidene fluoride resin or (001) plane of β-type crystals of vinylidene fluoride resin was taken from the X-ray diffraction pattern on a chart and the half value width thereof was obtained.

Separately, in order to make a correction of the instrumental error, another X-ray diffraction chart was obtained while using powder of single crystal of silicone under the same conditions, and the thus obtained half value width of the instrumental error was subtracted from the above-mentioned half value width, thereby the true half value width of the specimen ($\beta_w$) was obtained.

While using the thus obtained true half value width($\beta_w$) of the specimen, the average length of crystals of the specimen(L) was obtained from the following Scherrer's formula:

$$L = k\lambda/\beta_w \cos\theta$$

wherein $\theta$ is the Bragg's refraction angle of the diffraction plane taken in the determination, k is a constant of the value of 1 and $\lambda$ is the wave length of X ray (CuKα) (1.542 Å).

The value of birefringence (Δn) of the specimen is obtained according to the formula:

$$\Delta n = \frac{n\lambda + \epsilon}{d}$$

wherein the number(n) of the interference fringes is obtained by observation of the oblique section of the specimen (filament) under a polarization microscope provided with a pair of crossed Nicol prisms while using the light from a sodium-lamp (D line, of a wave length(λ) of 589 nm), and the compensating factor(ε) is obtained by observation of the specimen (corresponding to the diameter of the filament) under the same light source conditions as above except for inserting a Berek's compensator in the light path (refer to SENI-BENRAN (Manual of Fibers), Edition for Materials, Ed. by MARUZEN Co. Nov. 1968).

The process for preparing a shaped article of vinylidene fluoride resin according to the present invention will be explained as follows while referring to the respective shaped articles, filament and film.

In order to obtain the filament of vinylidene fluoride resin according to the present invention, the resin is melt-extruded at a temperature of not lower than the melting point thereof, preferably at a temperature of higher than 190° C., and the thus melt-extruded resin is subjected to drafting in order to orient the molecular chains of the resin and the thus drafted resin (taking a shape of filament) is cooled. The drafting used in the present invention means that a resin in a molten state is drawn into a fluid, whose temperature is below melting point of the resin, thereby obtaining a shaped article in a non-molten state. The shape and form of the thus obtained, shaped article includes not only a filament but also a film.

The necessary conditions in the steps of melt-extruding and drafting are as follows: (i) in melt-extruding, the shear rate is not more than 200 sec$^{-1}$, preferably not more than 100 sec$^{-1}$ and more preferably not more than 70 sec$^{-1}$ and (ii) both the ratio of the speed of winding-up the drafted filament to the speed of extruding the molten resin, in other words, the draft ratio (R), and the apparent viscosity of the molten resin($\eta_{app}$) satisfy the following formula:

$$\frac{R}{540} + \frac{\eta_{app}}{5.4 \times 10^4} \geq 1,$$

preferably, the following formula:

$$\frac{R}{540} + \frac{\eta_{app}}{5.4 \times 10^4} \geq 1.1 \text{ and}$$

more preferably, the following formula:

$$\frac{R}{540} + \frac{\eta_{app}}{5.4 \times 10^4} \geq 1.2$$

wherein $\eta_{app}$ is the apparent melt-viscosity of the resin when the resin is melt-extruded from the nozzle of 1 mm in diameter and 3 mm in length. Preferably, the drafting of the melt-extruded resin is carried out at a draft ratio (R) of not less than 300, more preferably 500 and most preferably 1000.

In order to obtain the film of vinylidene fluoride resin according to the present invention, the resin is also melt-extruded at a temperature of not lower than the melting point thereof, preferably higher than 190° C., and the thus melt-extruded resin (taking a thick film) is subjected to drafting in order to orient the molecular chains of the resin at a draft ratio of not less than 50, preferably not less than 100 while retaining the above-mentioned condition (i) for the filament, followed by cooling the thus drafted film.

In the case of preparing a film, other than the above-mentioned conditions, the following condition should be satisfied. Namely, the substantial deformation of the melt-extruded resin (in a form of a film) due to drafting must be effected at a restricted position of the film a little apart from the outlet of the die of the extruder. The substantial deformation of the melt-extruded film means the substantial reduction of the size of the film such as the thickness is actually recognized.

On the other hand, in the case of preparing the filament, the above-mentioned substantial deformation recognizable by the sudden reduction of the diameter of the filament, due to drafting is finished substantially at the position in a distance of about 50 cm from the outlet of the extruding die without taking any artificial means, although the distance changes a little while depending on the temperature and the speed of the melt-extrusion. Namely, the shaping of the vinylidene fluoride resin into a filament is a relatively easier step as compared to that into other form such as film, tube etc.

As will be presumed from the fact that any film of polypropylene or polyethylene terephthalate of high Young's modulus has not been publicly known, it has been considered very difficult to obtain a film of vinylidene fluoride of a high Young's modulus, however, according to the present invention, the object has been at the first time attained by the present inventor by the following method.

The melt-extruded resin is brought into contact at the first time to a roll maintained at a distance of less than 10 cm, preferably less than 5 cm apart from the outlet of the extruding die while maintaining the temperature of the surface of the roll of lower than the temperature causing the maximum crystallization velocity of the resin, and the drafting is carried out substantially before the melt-extruded resin is brought into contact to the roll, and the resin is cooled by the roll.

As has been described above, in the process of preparing a shaped article of vinylidene fluoride resin of a high Young's modulus, there is a case where the position at which the substantial drafting is effected must be restricted, and on the other hand, there is a case where such a position is automatically restricted without taking any artificial means. This is due to the shape of the shaped article to be prepared. Namely, the ease of occurrence of relaxation of molecular orientation of the extruded and drafted article of vinylidene fluoride resin depends on the shape of the shaped article thereof. In the case of a film, since the relaxation of molecular orientation in the direction of width thereof occurs more easily than that in the direction of the thickness thereof, it becomes necessary to effect the drafting within a specifically restricted space apart from the outlet of the extruding die.

At any rate, the larger the draft ratio is, the larger is the Young's modulus of the shaped article according to the present invention and the higher is the extent of orientation of the molecular chains in the resin of the shaped article.

After effecting the drafting of the melt-extruded resin, the drafted resin (in a form of shaped article such as a filament and a film) is cooled to hardly occur the occurrence of the relaxation of molecular orientation in the thus drafted resin in a specified shape. In the case of preparing the film, the role of the roll is both to control the shape of the deformed part of the melt-extruded resin and to cool the extruded resin. The cooling may be carried out spontaneously, however, it is preferably carried out forcibly while using a conventional cooling technique, for instance, using a chilled roll or directly blowing a coolant to the drafted shaped article. The temperature of the cooling roll or the coolant is lower than the temperature at which the resin shows the maximum crystallization velocity, preferably the temperature lower than the temperature at which the resin shows the maximum crystallization velocity by more than 50° C. For instance, in the case of the homopolymer of vinylidene fluoride, it is preferable to cool the drafted article to not more than 80° C., because the maximum crystallization velocity thereof is shown at around 130° C.

In the process according to the present invention, a single resin of vinylidene fluoride may be melt-extruded to obtain a single shaped article, however, the vinylidene fluoride resin may be coextruded with another thermoplastic resin to obtain a laminate shaped article.

Since the process for preparing a shaped article according to the present invention is carried out at a draft ratio of ordinarily from tens to hundreds as compared to the stretch ratio of a level of a few in the conventional stretching process wherein a thermoplastic resin is melt-extruded and crystallized followed by stretching (cold drawing), the present process has a merit that the productivity is remarkably high.

In addition, in the conventional process for preparing a shaped article from a thermoplastic resin, crystallization of a melt-extruded resin and stretching of the thus crystallized resin have been separately effected, and further, since the product obtained by the conventional stretching step is remarkably thermoshrinkable, it has been necessary to have a step for thermally treating the stretched shaped article.

On the other hand, according to the process of the present invention, not only the crystallization and drawing are effected substantially and simultaneously in one step, but also the thus obtained shaped article shrinks only a little when heated. Accordingly, in the process according to the present invention, the step for thermal treatment is not necessary with the result of the reduction of the number of steps and the time period of the production process.

The shaped article obtained by the process according to the present invention shows an average length of crystals in the direction of molecular chains of longer than 200 Å, when produced by the preferable condition longer than 250 Å and a birefringence of not less than $30 \times 10^{-3}$. Such shaped article has a high Young's modulus. According to the process of the present invention, a shaped article having a Young's modulus into the direction of the drafting of not less than 450 kg/mm$^2$ can be obtained, and by raising the draft ratio, a shaped article having Young's modulus of not less than 600 kg/mm$^2$, and more over, that having Young's modulus of not less than 700 kg/mm$^2$ can be obtained. The shaped article obtained according to the process of the present invention shows an alpha-type crystal structure.

Although in the case of polypropylene and polyethylene terephthalate, the shaped article obtained by the above-mentioned process while subjecting the meltextruded resin to drafting at the high draft ratio cannot be further stretched after cooling the drafted shaped article. However, on the other hand, contrary to the present inventor's presumption, the once drafted shaped article of vinylidene fluoride resin can be subjected further to stretching (cold-drawing) at an optional temperature in a range of from room temperature to the temperature below the melting point of the resin, preferably at a temperature of not lower than 100° C. and of course, lower than the melting point of the resin of vinylidene fluoride.

The stretching is carried out simultaneously with or subsequently to cooling the drafted shaped article. And then the stretched shaped article is cooled while using the conventional cooling technique.

The thus obtained shaped article shows a crystalline structure mainly composed of β-crystals and the Young's modulus thereof becomes larger than that before subjecting thereof to stretching. For instance, a filament having Young's modulus of not less than 800 kg/mm² is easily obtainable, and in the case of applying a higher draft ratio to the melt-extruded resin, a filament having Young's modulus of not less than 1000 kg/mm² and even not less than 1200 kg/mm² can be obtained by stretching.

In the case of a film, a film having Young's modulus of not less than 500 kg/mm² is easily obtainable. With increase of draft ratio, a film having Young's modulus of not less than 550 kg/mm², preferably not less than 600 kg/mm² can be obtained.

The Young's modulus in the direction perpendicular to the direction of drafting of the film obtained according to the present invention is lower than that in the direction of drafting. However, even from such a film, a laminate film showing high Young's modulus both in the longitudinal direction and in the transversal direction can be obtained by laminating two films to each other while laminating their respective draft directions perpendicular to each other. It is natural, however, a single film is sufficient for the use in which the film receives a unidirectional stress.

The shaped article obtained according to the process of the present invention has an elongation at break of not more than 15%, preferably 10% and a tensile strength of not less than 90 kg/mm², preferably 95 kg/mm² and more preferably 100 kg/mm².

The present invention will be explained more in detail while referring to the following non-limitative examples.

EXAMPLES 1 to 6 and COMPARATIVE EXAMPLE 1 to 6

Figure 1:
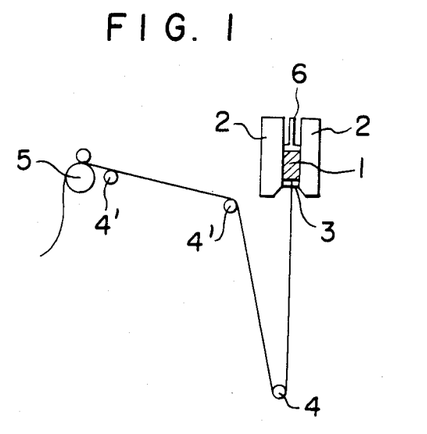
FIG. 1 shows the vertical cross-sectional view of the apparatus used in Examples 1 to 6, wherein 1 is a specimen in a molten state according to the present invention; 2 is a heater; 3 is a nozzle; 4, 4' and 4'' are guide rolls; 5 is one of a set of pintch rolls, used as a winding roll and 6 is an extruding plunger.

In Examples 1 to 6 and Comparative Examples 3 to 6, pellets of a homopolymer of vinylidene fluoride showing $\eta_{inh}$ of 1.1 dl/g, Huggins' constant of 0.303 and $(\overline{M}_w/\overline{M}_{nn})$ of 2.2 were supplied to an extruder (Meltindexer ®, made by TOYO SEIKI Co., Ltd., Japan, outlined in FIG. 1) provided with a nozzle 3 of 1 mm in diameter and 3 mm in length, and the homopolymer was melt-extruded at an extruding speed of 0.63 g/min at an extruding temperature shown in Table 1. Since the density of the homopolymer was 1.7 g/ml in a molten state, the shear rate ($D_w$) represented by the following formula:

$$D_w 4Q/\pi r^3$$

wherein Q is the extruding speed (volume per second) and r is the radius of the nozzle, was 62.8 sec$^{-1}$ in Examples 1 to 6 and Comparative Examples 3 to 6. After melt-extruding, the extruded homopolymer (in a shape of a filament) was brought into contact to three guide rolls 4, 4' and 4'', spontaneously cooled at an atmospheric temperature of 25° C. and wound up onto a winding-up rolls 5 of 10 cm in diameter and of the surface temperature of 25° C. at a draft ratio shown also in Table 1.

The thus obtained filament was subjected to a tensile tester to measure the tensile strength, elongation at break (length of the specimen of 100 mm, tensile speed of 100 mm/min at a room temperature of 23° C.) and the initial Young's modulus (length of the specimen of 100 mm, tensile speed of 10 mm/min to prepare a stress-strain curve from which the initial Young's modulus was obtained). The data are shown in Table 2.

Figure 2:
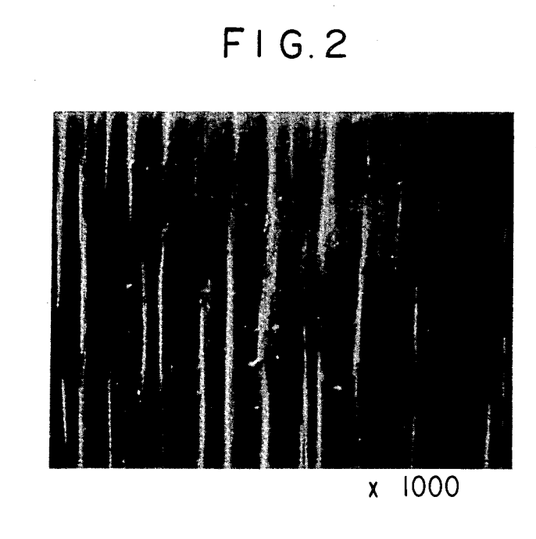
FIG. 2 is an electronmicrophotograph of the surface of the filament prepared in Comparative Example 1.

In Comparative Example 1, the same homopolymer was melt-extruded to be a filament and the filament was stretched at 160° C. in 6 times in length, and the stretched filament was thermally treated at 162° C. under tension. The electron-microphotograph of the surface of thus obtain filament is shown in FIG. 2.

In Comparative Example 2, the same melt-extruded filament was stretched at 100° C. in 4.5 times in length and naturally cooled to normal temperature without any thermal treatment. The properties of the thus obtained filaments in Comparative Examples 1 and 2, respectively, are also shown in Table 2.

TABLE 1

| Classification | Extruding temperature (°C.) | Melt[1] viscosity | Draft ratio (R) or stretch ratio (st) | $\dfrac{R}{540} + \dfrac{\eta_{app}}{5.4 \times 10^4}$ | | Shear stress (kg/cm²) |
|---|---|---|---|---|---|---|
| Example 1 | 220 | 3.2 | 220 (R) | 1.00 | | 2.06 |
| 2 | 240 | 2.6 | 350 (R) | 1.03 | | 1.67 |
| 3 | 240 | 2.6 | 390 (R) | 1.20 | | 1.67 |
| 4 | 260 | 1.9 | 450 (R) | 1.19 | | 1.22 |
| 5 | 280 | 1.6 | 820 (R) | 1.81 | | 1.02 |
| 6 | 290 | 1.5 | 860 (R) | 1.87 | | 0.97 |
| Comparative Example 1 | — | — | 6 (st) | — | | — |
| 2 | — | — | 4.5 (st) | — | | — |
| 3 | 200 | 3.9 | 3 (R) | 0.73 | | 2.50 |
| 4 | 200 | 3.9 | 14 (R) | 0.75 | | 2.50 |
| 5 | 200 | 3.9 | 75 (R) | 0.86 | | 2.50 |
| 6 | 240 | 2.6 | 140 (R) | 0.74 | | 1.67 |

Note:
[1]Melt-viscosity × 10$^{-4}$ (poise)

The values of birefringence, the average length of crystals and the shear stress of the respective filaments obtained in Examples 1 to 6 and Comparative Examples 1 to 6 are shown in Table 2.

ratio, the filament was broken, and accordingly, the spinning at a draft ratio of over 10 was impossible. The

TABLE 2

| Classification | Birefringence ×10³ | Average length of crystals (Å) | Young's modulus (kg/mm²) | Tensile strength (kg/mm²) | Elongation at break (%) | Appearance of the surface of filament |
|---|---|---|---|---|---|---|
| Example | | | | | | |
| 1 | 34 | 210 | 480 | 47 | 70 | |
| 2 | 35 | 230 | 570 | 63 | 45 | without any unevenness nor any stripes |
| 3 | 37 | 240 | 610 | 80 | 40 | |
| 4 | 38 | 260 | 650 | 85 | 35 | |
| 5 | 49 | 300 | 820 | 90 | 28 | |
| 6 | 41 | 310 | 850 | 93 | 25 | |
| Comparative Example | | | | | | |
| 1 | 35 | 110 | 280 | 80 | 28 | with numerous stripes |
| 2 | 30 | 70 | 265 | 55 | 40 | |
| 3 | 2 | 75 | 120 | 6 | 480 | with unevenness of micrometer order due to spherulites |
| 4 | 11 | 75 | 160 | 8 | 400 | |
| 5 | 20 | 80 | 170 | 12 | 270 | |
| 6 | 22 | 85 | 190 | 13 | 180 | |

EXAMPLE 7

The filament obtained by stretching the filament obtained in Example 6 in a silicone bath at 150° C. to 120% in length showed Young's modulus of 1460 kg/mm², an average length of crystals in the direction of the oriented molecular chains of 420 Å, a tensile strength of 112 kg/mm² and a birefringence of $42 \times 10^{-3}$.

COMPARATIVE EXAMPLE 7

Pellets of a polyvinylidene fluoride obtained by emulsion polymerization at 110° C. having Huggins' constant of 0.70 and $\eta_{inh}$ of 1.18 dl/g was tried to be melt-spun in the same manner as in Example 1, however, even it was spun at a melting temperature of 310° C., the maximum draft ratio was at most about 15 and the thus obtained filament showed a birefringence of $15 \times 10^{-3}$. In the trial of raising the spinning temperature of higher than 310° C., the polymer was decomposed while bubbling, and spinning could not be carried out.

EXAMPLE 8

A homopolymer of vinylidene fluoride having Huggins' constant of 0.31, $\eta_{inh}$ of 1.25 dl/g and $(\overline{M}_w/\overline{M}_n)$ of 2.4 was melt-extruded from a nozzle of 1 mm in diameter and 3 mm in length of the same apparatus in Example 1 at an extruding speed of 0.63 g/min at a melting temperature of 280° C., and was wound up in the same manner as in Example 1. At the draft ratio of 620, the Young's modulus of the obtained filament was 780 kg/mm² and the birefringence thereof was $38 \times 10^{-3}$.

COMPARATIVE EXAMPLE 8

A homopolymer obtained by suspension polymerization of vinylidene fluoride at 25° C. having Huggins' constant of 0.31 and $\eta_{inh}$ of 1.62 dl/g was subjected to melt-spinning at the same high draft ratio as in Example 1, however, even when melted at 310° C., the draft ratio could be raised at most about 10, and at a higher draft ratio, the filament was broken, and accordingly, the spinning at a draft ratio of over 10 was impossible. The birefringence of the filament obtained at a draft ratio of 10 was $12 \times 10^{-3}$.

EXAMPLE 9 and Comparative Examples 9 and 10

Pellets of a homopolymer of vinylidene fluoride showing Huggins' constant of 0.324, $\eta_{inh}$ of 1.0 dl/g and $(\overline{M}_w/\overline{M}_n)$ of 2.2 was extruded from a rectangular die of 25.4 mm long and 0.5 mm broad of a small extruder at a resin temperature of 220° C. and at a extruding speed of 4.5 g/min. The shear rate ($D_w$) represented by the formula:

$$D_w = 6Q/wt^2$$

wherein Q is the extruding speed (volume per second), w is the width of the nozzle of the die and t is the length of the nozzle of the die, was 41.6 sec$^{-1}$.

The thus melt-extruded film-like article was wound up on a rubber roll of a set of pinch roll consisting of two rubber rolls. In this operation, the pinch rolls were kept at a distance as small as possible to the extruding die to make the distance from the die head to the position at which the film-like article was pinched between the two pinch rolls to about 3 cm. A cold air was blown to the film-like article between the die head and the pinch rolls.

In Comparative Example 9, the distance between the die head and the pinch rolls was made to 50 cm, and the operation was carried out in the same manner as in Example 9.

In Comparative Example 10, a non-stretched film of 100 micrometer in thickness, prepared from the same resin as in Example 9 was monoaxially stretched at 100° C. at a stretching ratio of 4.

Physical properties of the shaped articles prepared in Example 9 and Comparative Examples 9 and 10 are shown in Table 3, wherein the respective values of Young's modulus and tensile strength are those measured in the direction of drafting or stretching.

TABLE 3

| Classification | Shape of article[1] width (mm) | Shape of article[1] thickness² | Draft ratio (R) or stretching ratio (st) | Young's modulus (kg/mm²) | Tensile strength (kg/mm²) | Thermal shrinkage at 160° C. (%) | Birefringence ×10³ | Appearance of the surface of the film |
|---|---|---|---|---|---|---|---|---|
| Example 9 | 14.0 | 7 | 130 (R) | 460 | 90 | 4 | 38 | without any unevenness nor stripes |
| Comparative | 2.8 | 53 | 130 (R) | 180 | 45 | 3 | 14 | with unevenness |

TABLE 3-continued

| Classification | Shape of article[1] width (mm) | thickness[2] | Draft ratio (R) or stretching ratio (st) | Young's modulus (kg/mm$^2$) | Tensile strength (kg/mm$^2$) | Thermal shrinkage at 160° C. (%) | Birefringence $\times 10^3$ | Appearance of the surface of the film |
|---|---|---|---|---|---|---|---|---|
| Example 9 Comparative Example 10 | | | 4 (st) | 220 | 85 | 37 | 36 | of micrometer with innumerable stripes |

Notes:
[1] the article obtained by melt-extruding the resin via a die of 25.4 mm and 0.5 mm in sides.
[2] thickness shown in micrometer.

EXAMPLE 10

Pellets of a homopolymer of vinylidene fluoride having Huggins' constant of 0.32, ($\overline{M}_w/\overline{M}_n$) of 2.5 and $\eta_{inh}$ of 1.20 dl/g was extruded from an extruder similar to that in Example 9 at a resin temperature of 280° C. and an extruding speed of 4.5 g/min, and the thus extruded film was wound up under a high draft ratio of 120. The thus prepared film showed Young's modulus of 510 kg/cm$^2$, birefringence of $39 \times 10^{-3}$ and average length of crystals in the direction of the oriented molecular claims of 320 Å.

EXAMPLE 11

The same resin as in Example 1 was melt-extruded from a nozzle of 3 mm in diameter and 3 mm in length of the same extruder as in Example 1 under the same conditions as in Example 6 except for the shear rate of 2.3 sec$^{-1}$ and subjected to drafting at the draft ratio of 10,800, followed by cooling the thus obtained filament to room temperature.

Figure 3:
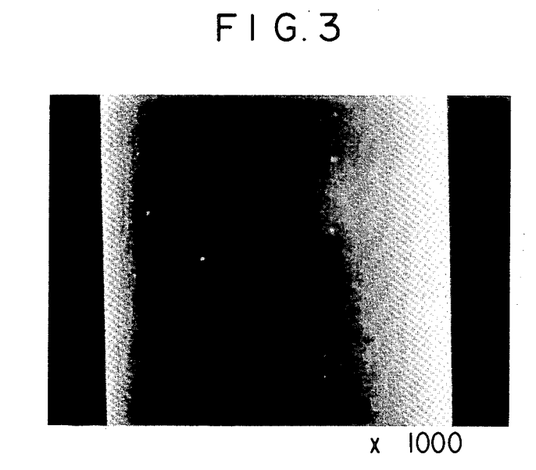
FIG. 3 is an electronmicrophotograph of the surface of the filament obtained by drafting in Example 11 and FIG. 4 is an electronmicrophotograph of the filament obtained by stretching the filament obtained by drafting in Example 11.

The thus obtained filament showed a Young's modulus of 860 kg/mm$^2$, a tensile strength of 92 kg/mm$^2$, an average length of crystals thereof of 330 Å and a birefringence of $39 \times 10^{-3}$. The electron-microphotograph of the surface of the thus obtained filament is shown in FIG. 3.

Further, the thus obtained filament was stretched under the same conditions as in Example 7 to 121% in length.

The thus stretched filament showed a Young's modulus of 1400 kg/mm$^2$, a tensile strength of 120 kg/mm$^2$, an average length of crystals in the direction of stretching of 450 Å and a birefringence of $41 \times 10^{-3}$.

Figure 4:
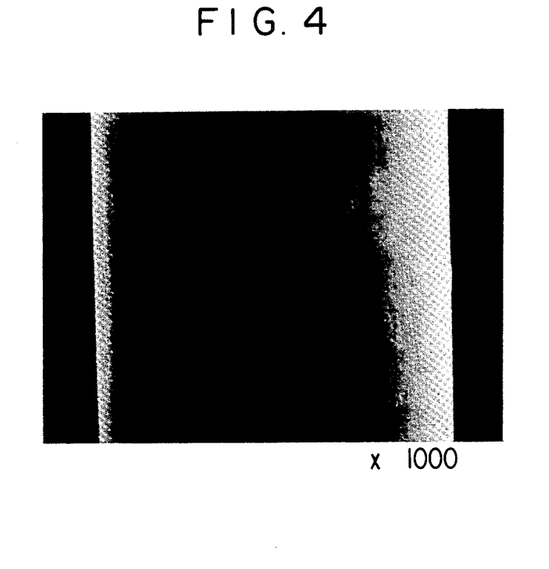

The electron-microphotograph of the surface of thus obtained filament is shown in FIG. 4.

COMPARATIVE EXAMPLE 11

Pellets of a homopolymer of vinylidene fluoride polymerized at 110° C. of Huggins' constant of 0.70 and $\eta_{inh}$ of 1.18 dl/g was subjected to the process according to the present invention, particularly at a die temperature of 250° C. and a distance between the die head and the pinch rolls of 10 cm as in Example 9, however, owing to the frequent break of the film under operation, it was not possible to wind up the film.

Thereafter, although the die temperature was raised to 300° C., it was impossible to wind up the film under a high draft ratio also owing to the frequent break of the film.

After all, the film was prepared under a draft ratio of at most 5, the birefringence of the thus prepared film was $8 \times 10^{-3}$.

COMPARATIVE EXAMPLE 12

A homopolymer of vinylidene fluoride obtained by suspension polymerization at 25° C., of Huggins' constant of 0.31 and $\eta_{inh}$ of 1.62 dl/g was subjected to the process according to the present invention, particularly under the same high draft ratio as in Example 9, however, owing to the frequent break of the film in operation of drafting, it was impossible to wind up the film.

Thereafter, even by raising the die temperature to 310° C., it was impossible to wind up the film under a high draft ratio, and by reducing the draft ratio to 4, it was possible to wind up the film of a birefringence of as low as $7 \times 10^{-3}$. As a result of raising the die temperature higher than 310° C., the polymer was thermally decomposed with bubbling not to be melt-extruded.

As will be seen in Examples 1 to 11, the shaped article of vinylidene fluoride resin according to the present invention show extremely high Young's modulus as compared to the conventional shaped articles of vinylidene fluoride resin. In particular, in the case where the melt-extruded resin was subjected to drafting under a high draft ratio of not less than 500 for filament and higher than 100 for film, and then the once shaped article was subjected to stretching, a finished shaped article showing an elongation at break of not more than 15% and a tensile strength of not less than 90 kg/mm$^2$ was obtained.

What is claimed is:

1. A shaped article of vinylidene fluoride resin having an inherent viscosity of 0.85 to 1.4 dl/g, Huggins' constant of not more than 0.45, an average length of crystals in the direction of the molecular chains of said resin of longer than 200 Å, a birefringence of not less than $30 \times 10^{-3}$ and a Young's modulus of not less than 450 kg/mm$^2$.

2. A shaped article of vinylidene fluoride resin according to claim 1, wherein said shaped article has an average length of crystals in the direction of the molecular chains of said resin of longer than 250 Å.

3. A shaped article of vinylidene fluoride resin according to claim 1, wherein the inherent viscosity of said vinylidene fluoride resin is 0.9 to 1.3 dl/g.

4. A shaped article of vinylidene fluoride resin according to claim 1, wherein the inherent viscosity of said vinylidene fluoride resin is 1.0 to 1.2 dl/g.

5. A shaped article of vinylidene fluoride resin according to claim 1, wherein Huggins' constant of said vinylidene fluoride resin is less than 0.4.

6. A shaped article of vinylidene fluoride resin according to claim 1, wherein Huggins' constant of said vinylidene fluoride resin is less than 0.35.

7. A shaped article of vinylidene fluoride resin according to claim 1, wherein the ratio of the weight-average molecular weight ($\overline{M}_w$) of said vinylidene fluoride resin to the number-average molecular weight ($\overline{M}_n$) of said vinylidene fluoride resin is not more than 10.

8. A shaped article of vinylidene fluoride resin according to claim 1, wherein the ratio of the weight-average molecular weight ($\overline{M}_w$) of said vinylidene fluoride resin to the number-average molecular weight ($\overline{M}_n$) of said vinylidene fluoride resin is not more than 5.

9. A process for preparing a filament of vinylidene fluoride resin, having an average length of crystals in the direction of the molecular chains of said resin of longer than 200 Å and a Young's modulus of not less than 450 kg/mm², comprising the steps of melt-extruding a vinylidene fluoride resin having an inherent viscosity of 0.85 to 1.4 dl/g and Huggins' constant of not more than 0.45 at a shear rate of not more than 200 sec$^{-1}$ and at a temperature of higher than the melting point of the vinylidene fluoride resin, subjecting the thus melt-extruded resin to drafting at a draft ratio (R) of higher than 300 represented by the following formula:

$$\frac{R}{540} + \frac{\eta_{app}}{5.4 \times 10^4} \geq 1$$

wherein $\eta_{app}$ is an apparent melt-viscosity (unit:poise) of the resin melt-extruded through a nozzle of 1 mm in diameter and 3 mm in length of Melt-indexer at the same temperatures as in the melt-extruding step, thereby orienting the molecular chains of the resin to the extent that the birefringence of the thus treated resin becomes not less than $30 \times 10^{-3}$, and cooling the thus drafted resin without substantially causing orientation relaxation to a temperature of lower than the temperature at which the velocity of crystallization of said vinylidene fluoride resin is maximum.

10. A process according to claim 9, wherein said cooled drafted resin is subjected to stretching at a temperature of lower than the melting point of vinylene fluoride resin.

11. A process according to claim 9, wherein the melt-extruded vinylidene fluoride resin is drafted so that the birefringence of the thus drafted resin becomes to not less than $33 \times 10^{-3}$.

12. A process according to claim 9, wherein said melt-extruded resin is subjected to drafting at a draft ratio (R) represented by the following formula:

$$\frac{R}{540} + \frac{\eta_{app}}{5.4 \times 10^4} \geq 1.1$$

wherein $\eta_{app}$ is as defined above.

13. A process according to claim 12, wherein said meltextruded resin is subjected to drafting at a draft ratio (R) represented by the following formula:

$$\frac{R}{540} + \frac{\eta_{app}}{5.4 \times 10^4} \geq 1.2$$

wherein $\eta_{app}$ is as defined above.

14. A process according to claim 9 or 10, wherein said melt-extruded resin is subjected to drafting at a draft ratio (R) of higher than 500.

15. A process according to claim 14, wherein said melt extruded resin is subjected to drafting at a draft ratio (R) of higher than 1,000.

16. A process according to claim 9, wherein said melt-extruding is carried out at a shear rate of not more than 100 sec$^{-1}$.

17. A process according to claim 9, wherein the inherent viscosity of said vinylidene fluoride resin is 0.9 to 1.3 dl/g.

18. A process according to claim 9, wherein Huggins' constant of said vinylidene fluoride resin is less than 0.4.

19. A process according to claim 9, wherein the ratio of the weight-average molecular weight ($\overline{M}_w$) of said vinylene fluoride resin to the number-average moecular weight ($\overline{M}_n$) of said vinylidene fluoride resin is not more than 10.

20. A process accoding to claim 10, wherein said stretching step is carried out simultaneously with said cooling step.

21. A process according to claim 10, wherein said stretching step is carried out subsequently to said cooling step.

22. A process for preparing a film of vinylidene fluoride resin, having an average length of crystals in the direction of the molecular chains of said resin of longer than 200 Å, a birefringence of not less than $30 \times 10^{-3}$ and a Young's modulus of not less than 450 kg/mm², comprising the steps of melt-extruding a vinylidene fluoride resin having an inherent viscosity of 0.85 to 1.4 dl/g and Huggins' constant of not more than 0.45 from a T-die at a shear rate of not more than 200 sec$^{-1}$ and at a temperature of higher than the melting point of the vinylidene fluoride resin, subjecting the thus melt extruded resin to drafting at a draft ratio of not less than 50, while retaining the distance between the outlet of said T-die and the point at which film of the vinylidene fluoride resin begins to contact a roll to which the melt-extruded resin contacts at the first time at less than 10 cm, and cooling by use of the roll the thus drafted resin to a temperature of lower than the temperature at which the velocity of crystallization of said vinylidene fluoride resin is maximum.

23. A process according to claim 22, wherein said cooled drafted resin is subjected to stretching at a temperature of lower than the melting point of vinylidene fluoride resin.

24. A process according to claim 22, wherein said draft ratio is not less than 100.

25. A process according to claim 22, wherein the inherent viscosity of said vinyliene fluoride resin is 0.9 to 1.3 dl/g.

26. A process according to claim 25, wherein the inherent viscosity of said vinylidene fluoride resin is 1.0 to 1.2 dl/g.

27. A process according to claim 22, wherein Huggins' constant of said vinylidene fluoride resin is less than 0.4.

28. A process according to claim 27, wherein Huggins' constant of said vinylidene fluoride resin is less than 0.35.

29. A process according to claim 22, wherein the ratio of the weight-average molecular weight ($\overline{M}_w$) of said vinylidene fluoride resin to the number-average molecular weight ($\overline{M}_n$) of said vinylidene fluoride resin is not more than 10.

30. A process according to claim 29, wherein the ratio of the weight-average molecular weight ($\overline{M}_w$) of said vinylidene fluoride resin to the number-average molecular weight ($\overline{M}_n$) of said vinylidene fluoride resin is not more than 5.

31. A process according to claim 22, wherein said melt-extruding is carried out at a shear rate of not more than 100 sec$^{-1}$.

32. A process according to claim 31, wherein said melt-extruding is carried out at a shear rate of not more than 70 sec$^{-1}$.

33. A process according to claim 22, wherein said distance between the outlet of T-die and the point at which film of the vinylidene fluoride resin begins to contact to the roll is less than 5 cm.

* * * * *

UNITED STATES PATENT AND TRADEMARK OFFICE
CERTIFICATE OF CORRECTION

PATENT NO. : 4,670,527

DATED : June 2, 1987

INVENTOR(S) : Toshiya Mizuno

It is certified that error appears in the above-identified patent and that said Letters Patent is hereby corrected as shown below:

--The first item of priority data was recorded incorrectly. It should read:

Mar. 2, 1981 [JP] Japan...........56-29740--

Signed and Sealed this

First Day of September, 1987

*Attest:*

DONALD J. QUIGG

*Attesting Officer*      *Commissioner of Patents and Trademarks*